United States Patent [19]

Scarlata

[11] Patent Number: 4,801,270

[45] Date of Patent: Jan. 31, 1989

[54] SHAFT MOUNTING AND ELECTRICAL GROUNDING DEVICE

[75] Inventor: Richard F. Scarlata, Rochester, N.Y.

[73] Assignee: Xerox Corporation, Stamford, Conn.

[21] Appl. No.: 104,470

[22] Filed: Oct. 5, 1987

[51] Int. Cl.⁴ .............................................. H01R 4/66
[52] U.S. Cl. ........................................ 439/95; 439/28; 439/92
[58] Field of Search ....................... 439/10, 17, 28, 29, 439/92, 95, 926, 930; 361/214

[56] References Cited

U.S. PATENT DOCUMENTS

| 2,583,189 | 1/1952 | Shewmon | 439/92 |
| 2,883,132 | 4/1959 | Neher | 439/92 X |
| 3,357,108 | 12/1967 | Bennett | 439/95 X |
| 3,564,477 | 2/1971 | Pompei | 439/17 |
| 4,538,019 | 8/1985 | Bramwell et al. | 174/6 |

FOREIGN PATENT DOCUMENTS 729311  3/1966  Canada ................................. 439/28

Primary Examiner—Eugene F. Desmond
Attorney, Agent, or Firm—H. Fleischer; J. E. Beck; R. Zibelli

[57] ABSTRACT

A device which supports a shaft rotatably in an electrically grounded frame. The shaft is mounted in bearings in the aperture of an electrically conductive molded member mounted on the frame. A grounding brush is secured to the molded member and electrically connects the shaft with the molded member so as to electrically ground the shaft.

11 Claims, 1 Drawing Sheet

SHAFT MOUNTING AND ELECTRICAL GROUNDING DEVICE

This invention relates generally to a shaft mounting, and more particularly concerns electrically grounding a shaft being supported rotatably by the mounting.

It is common practice to mount a bearing in the frame of a machine or apparatus to support a rotary shaft. Frequently, it is necessary to electrically ground the shaft rather than allowing it to float electrically. This is generally accomplished by connecting the shfat to an electrical ground by using a grounding brush. In electrophotoraphic printing machines, the ground brush is usually mounted on a bracket which, in turn, is mounted on a grounded surface, or, the ground brush is mounted on a bracket which is grounded by a ground strap or wire. Typically, a high volume commercial printing machine may require more than 50 such grounding brushes and their associated mounting systems. The cost of electrically grounding a shaft includes the cost of the ground brush, mounting bracketry, ground strap, hardware required to mount the ground brush to the mounting bracket, hardware required to mount the brush mounting bracket to a surface and hardware to mount the ground strap. Today, the printing machine market is highly competitive and costs are being continually driven downward. Accordingly, it is highly desirable to reduce the cost of the electrical grounding assembly required to electrically ground shafts in the printing machine. One way of accomplishing this is to eliminate the mounting assembly or significantly reduce the number of parts required to mount the ground brush.

Various types of arrangements have been developed for mounting and electrically grounding shafts, the following disclosures appear to be relevant:

U.S. Pat. No. 4,538,019
Patentee: Bramwell et al.
Issued: Aug. 27, 1985
U.S. Pat. No. 4,758,101
Applicant: Roof, Sr. et al.
Issued: July 19, 1988

The relevant portions of the foregoing disclosures may be briefly summarized as follows:

U.S. Pat. No. 4,538,019 discloses a wiper for grounding a control rod to a structure. The wiper is in longitudinal sliding contact with the rod periphery. The wiper is mounted to the structure by conductive arms and brackets, or by a joint or by a housing, or by a boot so that the wiper can track transverse motion of the rod.

Roof, Sr. et al. discloses a mounting which supports a bearing in a machine frame. The bearing is molded integrally in an aperture in the mounting. The outer race of the bearing is in molded non-rotative engagement with the mounting. The mounting has a plurality of mounting supports with at least one of the mounting supports being adapted to be received by the machine frame.

In accordance with the present invention, there is provided a device for supporting a shaft rotatably in an electrically grounded frame. The device includes an electrically conductive molded member mounted on the frame. The molded member has an aperture therein. Means, mounted in the aperture of the molded member, rotatably support the shaft. Means, mounted on the molded member, electrically connect the molded member to the shaft so as to electrically ground the shaft.

Other features of the present invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
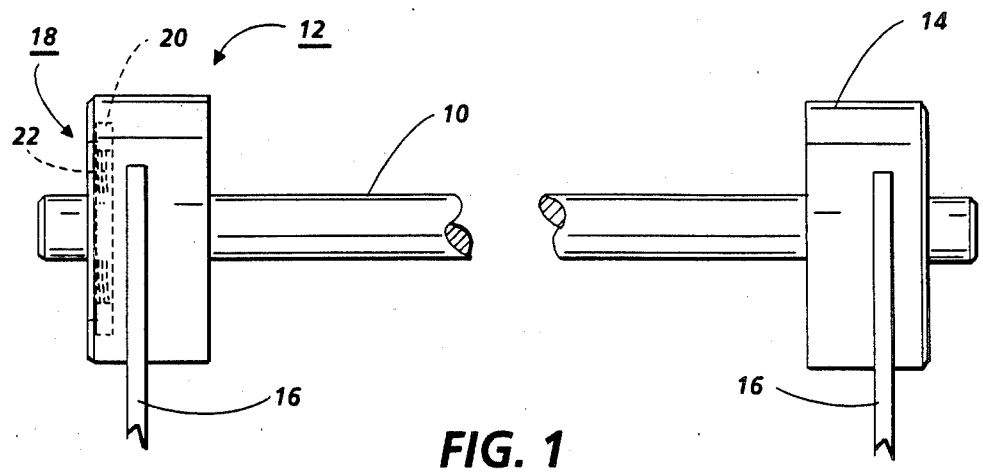
FIG. 1 is an elevational view, partially in section, illustrating a shaft mounted in and electrically grounded by a mounting employing the features of the present invention therein.

Turning now to FIG. 1, there is shown an elevational view of a shaft 10 supported by a pair of mountings 12 and 14. Mountings 12 and 14 are identical to one another. Both mountings are mounted on a frame 16 which is electrically grounded. Frame 16 may be electrically grounded by a ground strap or by any other suitable device. An electrical grounding brush, indicated generally by the reference numeral 18, is mounted on mounting 12. Grounding brush 18 electrically connects shaft 10 with mounting 12. Both shaft 10 and mounting 12 are electrically conductive. Mounting 12 is mounted on electrically grounded frame 16. Thus, an electrical path is provided for electrically grounding shaft 10. Grounding brush 18 includes a support 20 having a multiplicity of fibers 22 extending outwardly therefrom. The free end region of fibers 22 contact shaft 10. Support 20 and fibers 2 are electrically conductive. Further details of mounting 12 and ground brush 18 will be discussed hereinafter with reference to FIGS. 2 and 3.

Figure 2:
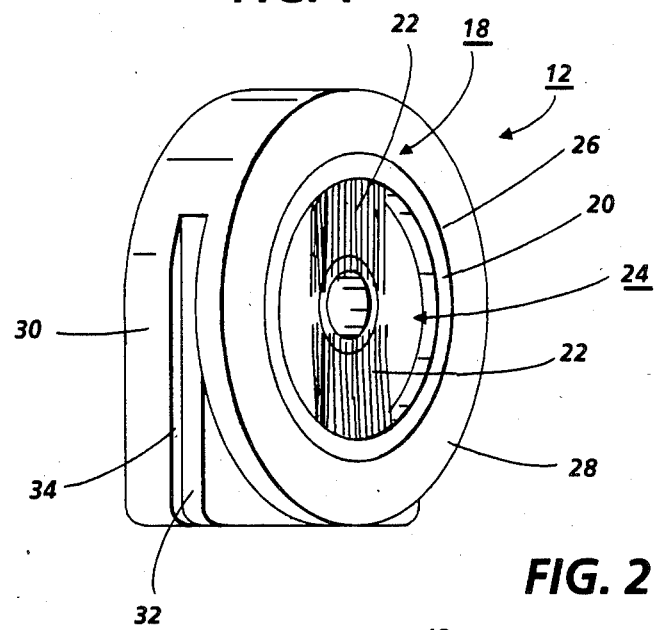
FIG. 2 is a perspective view of the FIG. 1 shaft mounting and grounding device.

Referring now to FIG. 2, there is shown a perspective view of the mounting, indicated generally by the reference numeral 12, and grounding brush 18. A bearing, indicated generally by the reference numeral 24, is mounted in aperture or circular hole 26 of mounting 12. The outer race of bearing 24 is in molded non-rotative engagement with mounting 12. Mounting 12 and bearing 24 are formed integrally with one another. Bearing 24 is automatically inserted into a mold and the mounting material is injected therein. Upon curing, the mounting, with the bearing molded integrally therewith, is removed from the mold. In this way, mounting 12 is molded around the outer race of bearing 24 in such a ways as to capture it. This prevents axial movement of the bearing relative to the mounting. Without this design feature, the mounting would creep under induced stress. This would, in time, result in axial separation of the bearing from the mounting. Mounting 12 is mounted in the frame of a machine. The inner race of bearing 24 supports shaft 20 rotatably. The shaft is press fit into the inner race of bearing 24 to rotate in unison therewith. One surface of mounting 12 has a cylindrical region 28 extending outwardly therefrom. The other surface, opposed from cylindrical region 28, has a D-shaped region 30 extending outwardly therefrom. This enables mounting 12 to be mounted either in a circular opening in the frame by using cylindrical region 28 as the mounting region, or in a D-shaped opening in the frame by using D-shaped region 30 as the mounting region. In addition, mounting 12 has a slot 32 on surface 34 and a slot (not shown) on the surface opposed thereto. These surfaces are perpendicular to the surfaces from which cylindrical region 28 and D-shaped region 30 extend outwardly from. These slots may interfit into a clip which, in turn, is mounted on the machine frame, or clip into the frame directly as a mounting surface. Mounting 12 is made from an electrically conductive plastic material. Preferably, mounting 12 is made from a conductive resin containing conductive particles. Further details of mounting 12 are discussed in co-pending U.S. patent application Ser. No. 49,197, filed May 13, 1987 by Roof, Sr. et al., the relevant portions thereof being hereby incorporated into the present application.

Grounding brush 18 is mounted on mounting 12 and located so that fibers 22 contact shaft 10. Support 20 is a ring injection molded from a conductive plastic material, such as a conductive resin containing conductive particles. Two bundles of fibers 22 are molded integrally with ring 20 with the free ends thereof extending outwardly from opposed sides thereof. Each bundle of fibers includes from fifty to one thousand fibers. Each fiber has a diameter ranging from about five to about fifty microns. The fibers are electrically conductive. Preferably, the fibers are made from stainless steel or carbon. The fibers extend outwardly from ring 20 an effective length of about twelve millimeters, and exhibit sufficient resiliency and stiffness, as well as high wear resistance, to be used for a long period of time without distortion or deflection to preserve an excellent electrical discharging performance over extended periods of time. Ring 20 is pressed into aperture 26 of mounting 12.

Figure 3:
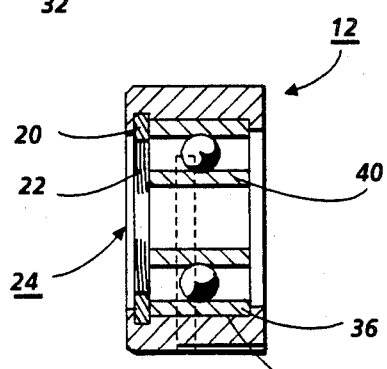
FIG. 3 is a sectional, elevational view of the FIG. 1 shaft mounting and grounding device.

Referring now to FIG. 3, bearing 24 is shown molded integrally in mounting 12. As depicted thereat, outer race 36 is molded in non-rotative engagement with the interior surface 38 of mounting 12. In this way, mounting 12 is molded around the outer race of bearing 24 in such a way as to capture it. This prevents axial movement of the bearing relative to the mounting. Bearing 24 is a ball bearing with the inner race 40 supporting shaft 10 rotatably. By way of example, bearing 24 may be a single row, ABEC 1 radial ball bearing. Grounding brush 18 is press fit or snapped into opening 26 in mounting 12 so as to form a good electrical connection and secure mounting therefor.

In recapitulation, it is apparent that grounding brush is mounted on the mounting supporting a shaft rotatably so as to electrically ground the shaft. The grounding brush is snapped or press fit into an opening in the mounting. The entire assembly is relative simple resulting in a significant cost reduction.

It is, therefore apparent that there has been provided in accordance with the present invention, a shaft mounting and electrical grounding device that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations as fall within the scope and broad scope of the appended claims.

I claim:

1. A device for supporting a shaft rotatably in an electrically grounded frame, including:
   an electrically conductive molded member mounted on the frame, said molded member having an aperture therein;
   means, mounted in the aperture of said molded member, for rotatably supporting the shaft; and
   means, mounted on said molded member, for electrically connecting said molded member to the shaft so as to electrically ground the shaft.

2. A device according to claim 1, wherein said rotatably supporting means includes:
   an inner race adapted to support the shaft and rotate substantially in unison therewith; and
   an outer race in molded non-rotative engagement with said molded member.

3. A device according to claim 2, wherein said connecting means includes:
   a support member; and
   a multiplicity of fibers extending outwardly from said support member in contact with the shaft.

4. A device according to claim 3, wherein said multiplicity of fibers include at least two bundles of fibers extending outwardly from said ring with said bundles being opposed from one another.

5. A device according to claim 4, wherein said bundles of fibers are molded integrally with said ring.

6. A device according to claim 5, wherein the aperture in said molded member is located in a selected position so that when said support member is mounted therein, the fibers extending outwardly therefrom contact the shaft.

7. A device according to claim 3, wherein said support member includes a ring adapted to be mounted in the aperture in said molded member.

8. A device according to claim 7, wherein the outer race of said bearing member is captured to prevent axial movement thereof relative to said molded member.

9. A device according to claim 8, wherein said molded member is a unitary member.

10. A device according to claim 9, wherein said support member is made from an electrically conductive material.

11. A device according to claim 10, wherein said fibers are made from an electrically conductive material.

* * * * *